United States Patent [19]
Tanaka

[11] Patent Number: 5,930,498
[45] Date of Patent: Jul. 27, 1999

[54] APPARATUS FOR STABLY PRODUCING DISCRETED GRID POINTS

[75] Inventor: Katsuhiko Tanaka, Tokyo, Japan

[73] Assignee: NEC Corporation, Tokyo, Japan

[21] Appl. No.: 08/827,048

[22] Filed: Mar. 25, 1997

[30]     Foreign Application Priority Data

Mar. 25, 1996  [JP]  Japan ................................ 8-068099

[51] Int. Cl.$^6$ ............................ G06F 15/00; G06F 17/50
[52] U.S. Cl. ....................................................... 395/500.05
[58] Field of Search ............................ 395/500; 364/578, 364/488–491

[56]             References Cited

U.S. PATENT DOCUMENTS

| | | | |
|---|---|---|---|
| 5,070,469 | 12/1991 | Kunikiyo et al. | 364/578 |
| 5,315,537 | 5/1994 | Blacker | 364/578 |
| 5,367,465 | 11/1994 | Tazawa et al. | 364/578 |
| 5,671,395 | 9/1997 | Akiyama | 395/500 |
| 5,684,723 | 11/1997 | Nakadai | 364/578 |
| 5,768,156 | 6/1998 | Tautges et al. | 364/578 |
| 5,774,696 | 6/1998 | Akiyama | 395/500 |

FOREIGN PATENT DOCUMENTS 64-86078   3/1989   Japan .

OTHER PUBLICATIONS

Ciampolini et al., IBEE Transactions on Computer–Aided Design, vol. 8, No. 5, May 1989, pp. 400–500 "Adaptive Mesh Generation Preserving the Quality of the Initial Grid".

Primary Examiner—Kevin J. Teska
Assistant Examiner—Ayni Mohamed
Attorney, Agent, or Firm—Foley & Lardner

[57]             ABSTRACT

A discreted grid producing apparatus is for discreting an analytic region into a plurality of micro-regions of discreted grid points on numerically solving a partial differential equation. The apparatus produces a discreted grid for use in obtaining simultaneous equations approximating to the partial differential equation. The apparatus comprises a grid producing section for producing grids as boundary grids on a surface and a boundary of an analytic region. The grid producing section may modifies locations of grids in order to prevent each of CV regions from passing the surface and the boundary. A basic grid producing section forms a rectangular region including the analytic region. The basic grid producing section recurrently divides the rectangular region into a plurality of micro-rectangular regions to produce basic grids. A deleting section deletes specific ones of the basic grids that exist in the analytic region. The deleting section further deletes selected ones of the basic grids that the CV regions pass the surface or the boundary of the analytic region. A Delaunay division section carries out Delaunay division of the analytic region in accordance with remaining basic grids and the boundary grids to produce discreted grids.

5 Claims, 11 Drawing Sheets

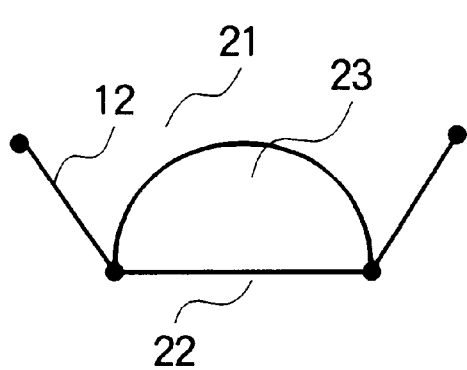
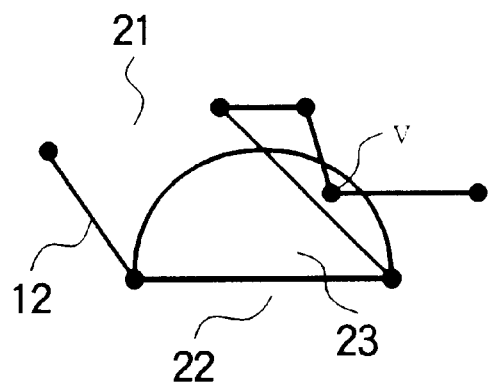
FIG. 14A          FIG. 14B
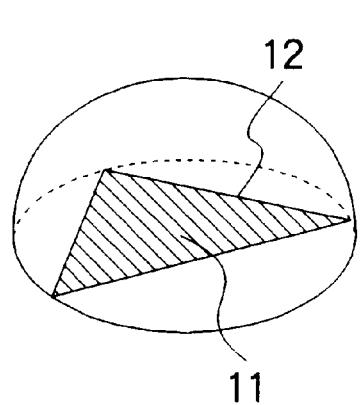
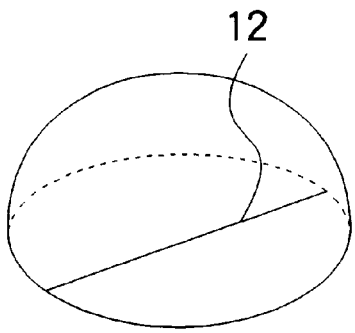
FIG. 15A          FIG. 15B

APPARATUS FOR STABLY PRODUCING DISCRETED GRID POINTS

BACKGROUND OF THE INVENTION

This invention relates to a grid producing apparatus for producing grid points for use in discreting a space on numerically solving a partial differential equation.

On numerically solving a partial differential equation, discreted grid is produced which is for use in dividing an analytic region into a plurality of micro-regions in order to obtain simultaneous equations approximating to the partial differential equation. On obtaining the simultaneous equations, use may be made of a finite element method or a finite difference method. On calculating an electric characteristic of a semiconductor device, the finite element method is used in which micro-regions are defined which are charged by the discreted grid points, respectively. In the finite element method, a test function may be used which has "1" in each of the micro-regions and "0" in other regions. Such a finite element method may be called a control volume method. Each of the micro-regions may be called a control volume (CV) region in the control volume method.

On stably solving the partial differential equation, it is necessary to prevent the CV regions from overlap. Furthermore, it is necessary to prevent each of the CV regions from passing a boundary between one analytic region and another analytic region.

On producing the discreted grid, a grid producing method is disclosed as a first conventional method in Japanese Patent Publication Tokkai Syo 64-86078 (86078/1989). Furthermore, another grid producing method is disclosed as a second conventional method in IEEE Trans. Computer-Aided-Design, Vol. 8, No. 5, 1989.

However, it is difficult to obtain the discreted grid for use in stable numerical analysis in each of the first and the second conventional methods as will be described later.

SUMMARY OF THE INVENTION

It is an object of this invention to provide a grid point producing apparatus for stably producing discreted grid points for use in numerical analysis.

Other objects of this invention will become clear as the description proceeds.

On describing the gist of this invention, it is possible to understand that an apparatus is for discreting an analytic region into a plurality of micro-regions of discreted grid points on numerically solving a partial differential equation. The apparatus produces a discreted grid for use in obtaining simultaneous equations approximating to the partial differential equation.

According to this invention, the apparatus comprises first means for discreting the analytic region to obtain grid points and second means for controlling locations of the grid points so that the grid points are not located in a predetermined region.

BRIEF DESCRIPTION OF THE DRAWINGS

FIGS. 14A and 14B show a view for describing a prohibiting region in a two dimension;

FIGS. 15A and 15B show a view for describing a prohibiting region of a non-obtuse triangle in a three dimension;

DESCRIPTION OF THE PREFERRED EMBODIMENT

Figure 1:
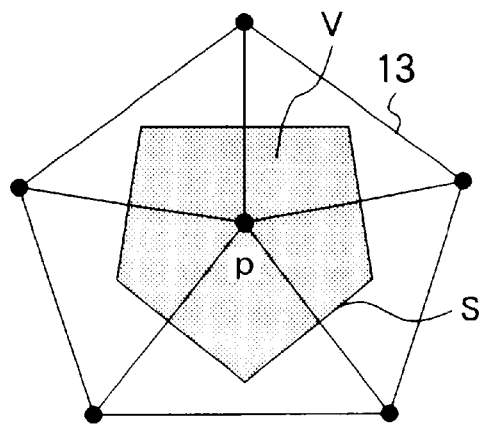
FIG. 1 shows a view for describing a control volume (CV) region corresponding to a discreted grid point.

Referring to FIG. 1, description will be made as regarding numerical solution of Poisson Equation by a control volume (CV) method for a better understanding of this invention. Poisson Equation is given by:

$$\nabla(\epsilon\nabla\Phi)=-\rho \quad (1)$$

where $\Phi$ represents an electric potential which is an unknown quantity, $\epsilon$ and $\rho$ represent permittivity and charge density each of which is a known quantity.

When a CV region (V) of a grid point (p) is given in a discreted grid 13, Poisson Equation is integrated in the CV region (V) to be processed into Equation (2) by using Gauss' theorem.

$$\int_S \epsilon\nabla\Phi\cdot n\, dS = -\int_V \rho\, dV \quad (2)$$

The integration of left band is representative of an integration along a surface (S) of the CV region. The integration of right hand is representative of an integration inside the CV region. n is representative of an unit vector perpendicular to the surface (S).

In general, the CV region (V) is defined by an area surrounded by vertical bisectors of grid edges each of which connects an adjacent grid point and the grid point (p) as shown in FIG. 1. When the CV region is determined as described above, the component of $\nabla\Phi(\Delta\Phi\cdot n)$ perpendicular to the surface (S) of the CV region approximates to a value which is obtained by dividing a difference by a distance between grid points. The difference is representative of a difference between a value of $\Phi$ of the grid point (p) and a value of $\Phi$ of the adjacent grid point.

The integration of the right hand of Equation (2) represents the amount of charge in the CV region (V) and becomes a constant. Therefore, Equation (2) approximates to an equation having a voltage potential as the unknown quantity between the grid point (p) and each of adjacent grid points. Similarly, an equation is produced in concern with a CV region of each grid point. The simultaneous equations obtained in the above manner is solved in order to obtain the voltage potential of each grid point.

Figure 2A:
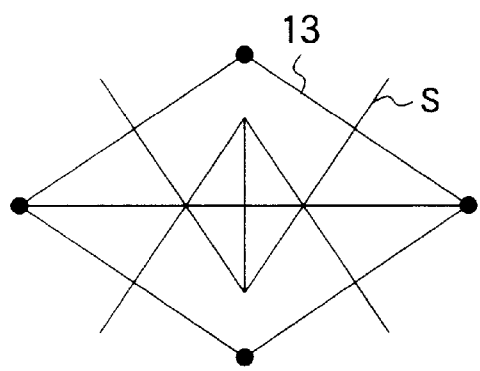
FIGS. 2A and 2B show a view for describing an inappropriate CV region and a discreted grid point providing the inappropriate CV region.
Figure 2B:
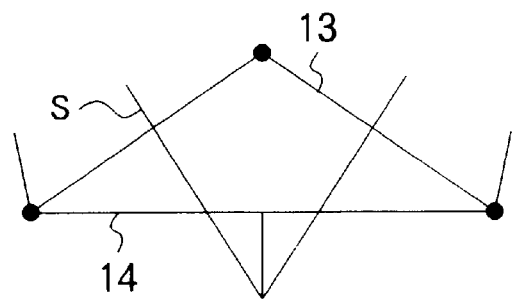

Referring to FIG. 2, it is known in the art that it is necessary to prevent CV regions from overlap in the discreted grid 13 as shown in FIG. 2A. It is necessary to prevent CV regions from passing the surface (S) of the discreted grid 13 and/or a boundary 14 between regions having different characteristics as shown in FIG. 2B in order to stably carry out physically correct calculation.

In case where the above-mentioned factors are not satisfied, it is difficult to obtain solutions inasmuch as a numerical instability occurs on solving the simultaneous equations obtained by discreting.

In order that the CV regions surrounded by vertical bisectors do not overlap to one another, it is necessary for an original triangle grid to become a region division which will be called Delaunay division. In case where each of the CV regions is a three dimensional region, it is necessary for a tetrahedron grid to become Delaunay division. In a two dimensional region, Delaunay division means that the circumscribed circle does not include a grid point in any triangle elements of the grid. In the three dimensional region, Delaunay division means that the circumscribed sphere does not include a grid point in any tetrahedron elements of the grid. However, the CV region may pass the boundary as shown in FIG. 2B even if Delaunay division is used.

Figure 3:
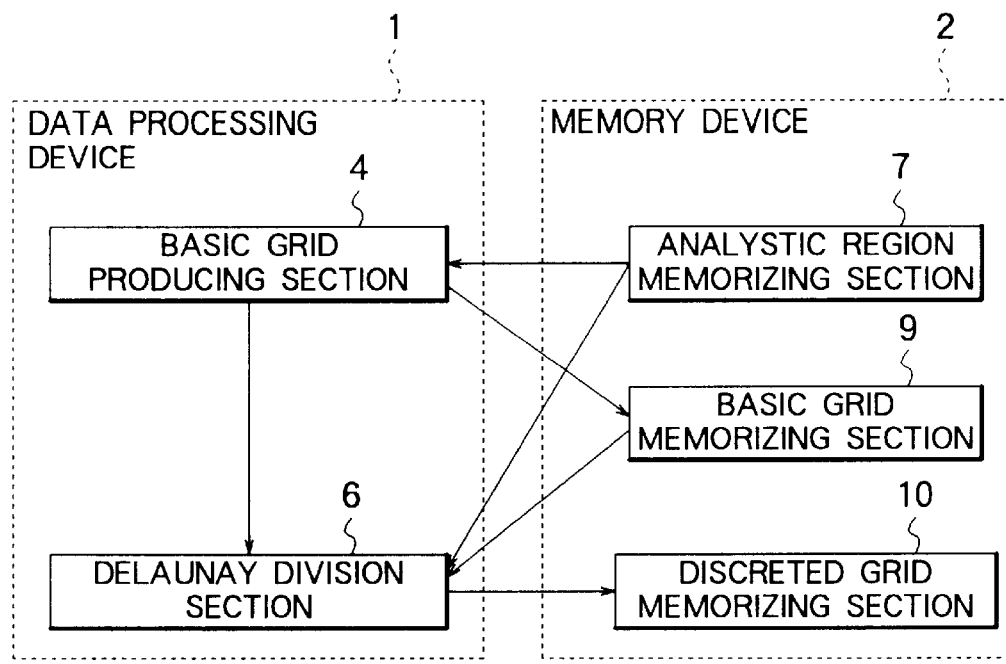
FIG. 3 is a block diagram of a conventional grid point producing apparatus.

Referring to FIG. 3, description will be made as regards a conventional grid producing apparatus. The illustrated grid producing apparatus comprises a data processing device 1 and a memory device 2. The data processing device 1 comprises a basic grid producing section 4 and Delaunay division section 6. The memory device 2 comprises an analytic region memorizing section 7, a basic grid memorizing section 9, and a discreted grid memorizing section 10.

The analytic region memorizing section 7 memorizes an analytic data representative of an analytic region. A micro-rectangular element may be used as a basic grid element in each of two dimension and three dimension. Furthermore, a triangle pole element or a square cone element may be used as the basic grid element in three dimension.

Figure 4:
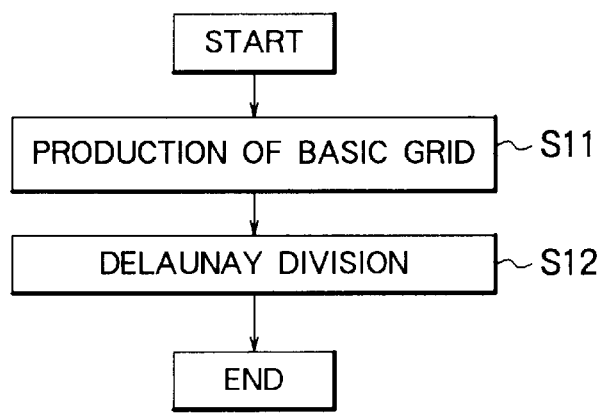
FIG. 4 is a flow chart for describing a process of the grid point producing apparatus illustrated in FIG. 3.

Referring to FIG. 4 in addition to FIG. 3, the basic grid producing section 4 reads an analytic data out of the analytic region memorizing section 7. The basic grid producing section 4 produces a basic grid in accordance with the analysis data at a first step S11 as shown in FIG. 4. More particularly, the basic grid producing section 4 forms a rectangular region including the analytic region. The basic grid producing section 4 recurrently divides the rectangular region into a plurality of micro-rectangular regions until a predetermined degree of approximation is obtained. The basic grid has the plurality of micro-rectangular regions. The micro-rectangular region may be called the micro-rectangular element. The basic grid producing section 4 stores the basic grid in the basic grid memorizing section 9.

The Delaunay division section 6 reads the analytic data out of the analytic region memorizing section 7. Furthermore, the Delaunay division section 6 reads the basic grid out of the basic grid memorizing section 9. On the basis of the analytic data and the basic grid, the Delaunay division section 6 carries out Delaunay division to produce a discreted grid at a second step S12 as shown in FIG. 4. More particularly, the Delaunay division section 6 carries out Delaunay division of each of the micro-rectangular regions to produce the discreted grid. The Delaunay division section 6 stores the discreted grid in the discreted grid memorizing section 10.

Figure 5A:
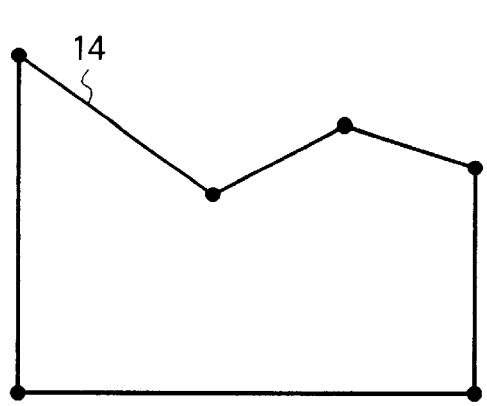
FIGS. 5A and 5B show a view for describing a first conventional method for producing a discreted grid point.
Figure 5B:
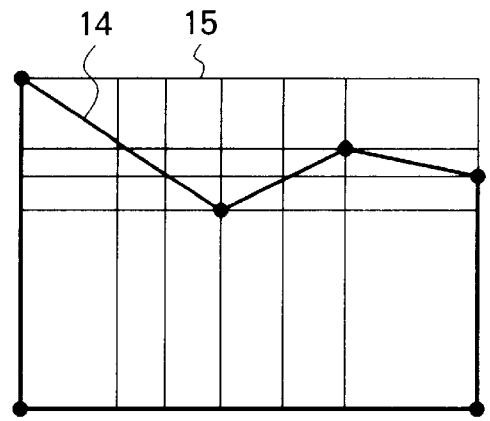

Referring to FIGS. 5A and 5B, description will proceed to a first conventional method for producing the discreted grid. When the analytic region is given as a polygon having a boundary 14 as shown in FIG. 5A, an orthogonal grid line is formed from each vertex of the polygon. When the orthogonal grid line again crosses with the boundary 14, an additional orthogonal grid line is formed from a cross point of the orthogonal grid line and the boundary 14 in order to produce the basic grid 15 having a plurality of micro-rectangular regions or elements as shown in FIG. 5B. The basic grid may be further divided according to need as a similar manner described above.

Each of the micro-rectangular elements may includes the boundary 14 as a side line or a diagonal line. Therefore, each of micro-rectangular elements is divided into a triangle element. Each of the triangle element is constructed by a right triangle. As described above, discreted grid is produced on the basis of the basic grid.

Figure 6A:
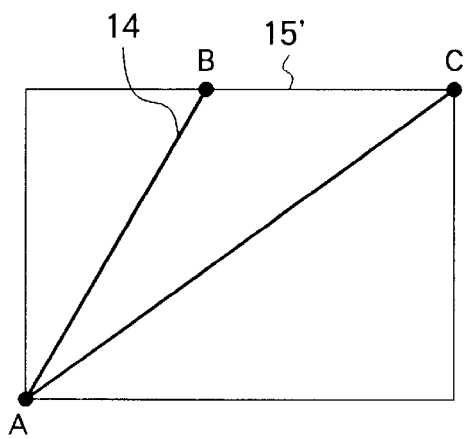
FIGS. 6A and 6B show a view for describing a failure of production of a discreted grid point in FIG. 5.
Figure 6B:
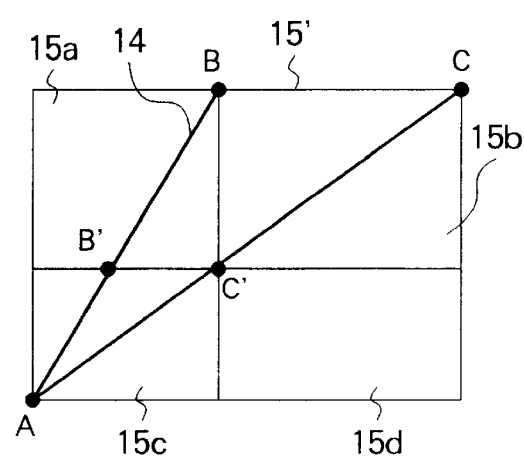

However, a stable operation may not be always carried out in the first conventional method. Referring to FIGS. 6A and 6B, it will be assumed that a rectangular element 15' includes the boundary 14 having segments AB and AC as shown in FIG. 6A. In this case, a vertical grid line is produced which passes a point B. The vertical grid line crosses with the segment AC. Therefore, a horizontal grid line is produced which passes a cross point C' of the vertical grid line and the segment AC. The horizontal grid line crosses with the segment AB at a cross point B'. As a result, the rectangular element 15' is divided into four micro-rectangular elements 15a to 15d as shown in FIG. 6B. Inasmuch as the micro-rectangular element 15c is similar to the rectangular element 15 illustrated in FIG. 6A, the above-mentioned operation is again carried out in the micro-rectangular element 15c.

As readily understood from the above description, a micro-rectangular element similar to the rectangular element 15 illustrated in FIG. 6A is produced even if the above-mentioned operation is infinitely carried out. At that time, the CV region of the point B passes the segment AC.

Figure 7A:
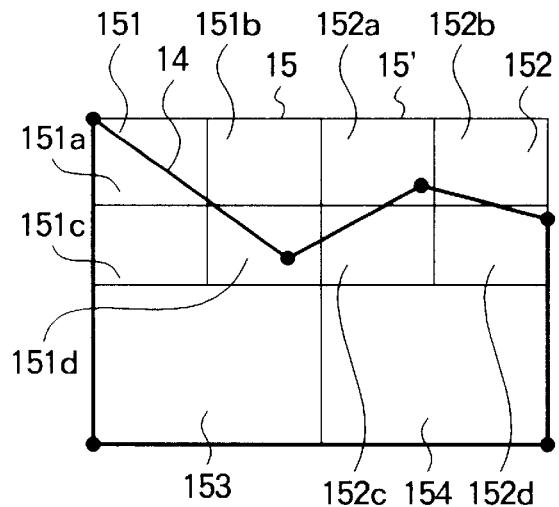
FIGS. 7A and 7B show a view for describing a condition of a grid point in a second conventional method for producing a discreted grid point.
Figure 7B:
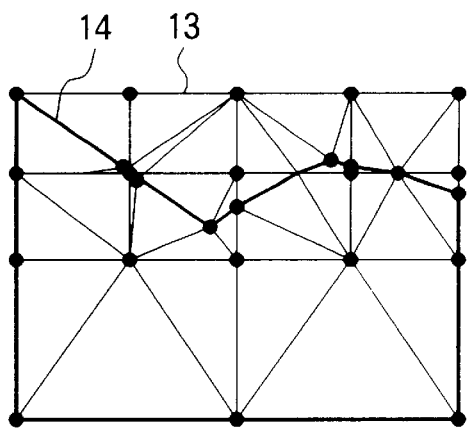

Referring to FIGS. 7A and 7B, description will proceed to a second conventional method for producing a discreted grid. When the analytic region is given as the polygon having the boundary 14 as shown in FIG. 7A, a rectangular element 15' is formed which surrounds the polygon. When the rectangular element 15' has a complex inside region, the rectangular element 15' is divided into four micro-rectangular elements 151 to 154 each of which is equal in size to one another. Inasmuch as the micro-rectangular element 151 has a complex inside region, the micro-rectangular element 151 is further divided into four micro-rectangular element 151a to 151d which are equal in size to one another. Similarly, the micro-rectangular element 152 is further divided into four micro-rectangular element 152a to 152d which are equal in size to one another inasmuch as the micro-rectangular element 152 has a complex inside region. As a result, the basic grid 15 is produced which is illustrated in FIG. 7A. Delaunay division is carried out at each of micro-rectangular elements of the basic grid 15 in order to produce the discreted grid 13 having triangle elements as shown in FIG. 7B.

Figure 8A:
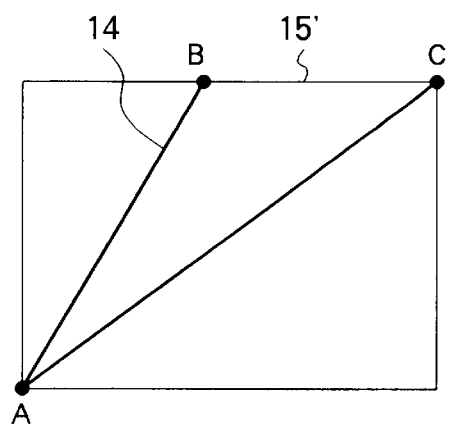
FIGS. 8A and 8B show a view for describing a failure of production of a discreted grid point in the second conventional method.
Figure 8B:
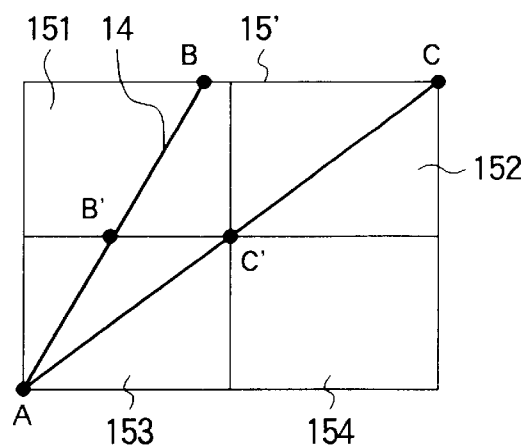

Referring to FIGS. 8A and 8B, it will be assumed that the rectangular element 15' includes the boundary 14 having segments AB and AC as shown in FIG. 8A. As described above, the rectangular element 15' is divided into four micro-rectangular elements 151 to 154 which are equal in size to one another. As readily understood from FIG. 8B, the CV region of the point B passes the segment AC.

As described above, the CV region passes the boundary in both of first and the second conventional methods.

Figure 9:
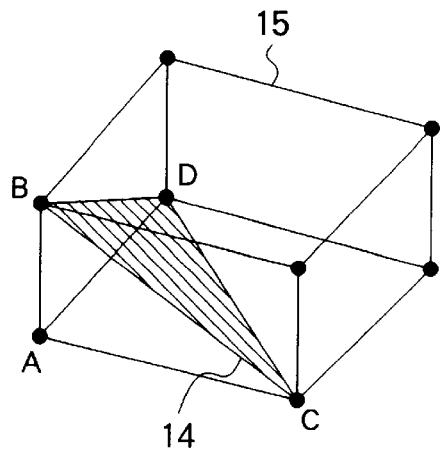
FIG. 9 shows a view for describing an example of a grid point providing an inappropriate CV region in production of a three dimensional discreted grid point.

Referring to FIG. 9, production of three dimensional grid has a problem similar to production of to dimensional grid. When a inclined boundary surface 14' exists in three dimensional space as shown in FIG. 9, the basic grid 15 frequently appears at which the surfaces cross with each other. At that time, the CV region of a grid point (A) is a polyhedron having a central point of a rectangular solid of a basic grid as a vertex. The central point is located on the opposite side of the grid point (A) in concern with the surface (BCD). Therefore, the CV region of the grid point (A) passes the surface (BCD). Namely, it is difficult to apply each of the first and the second conventional methods to production of three dimensional grid.

Figure 10:
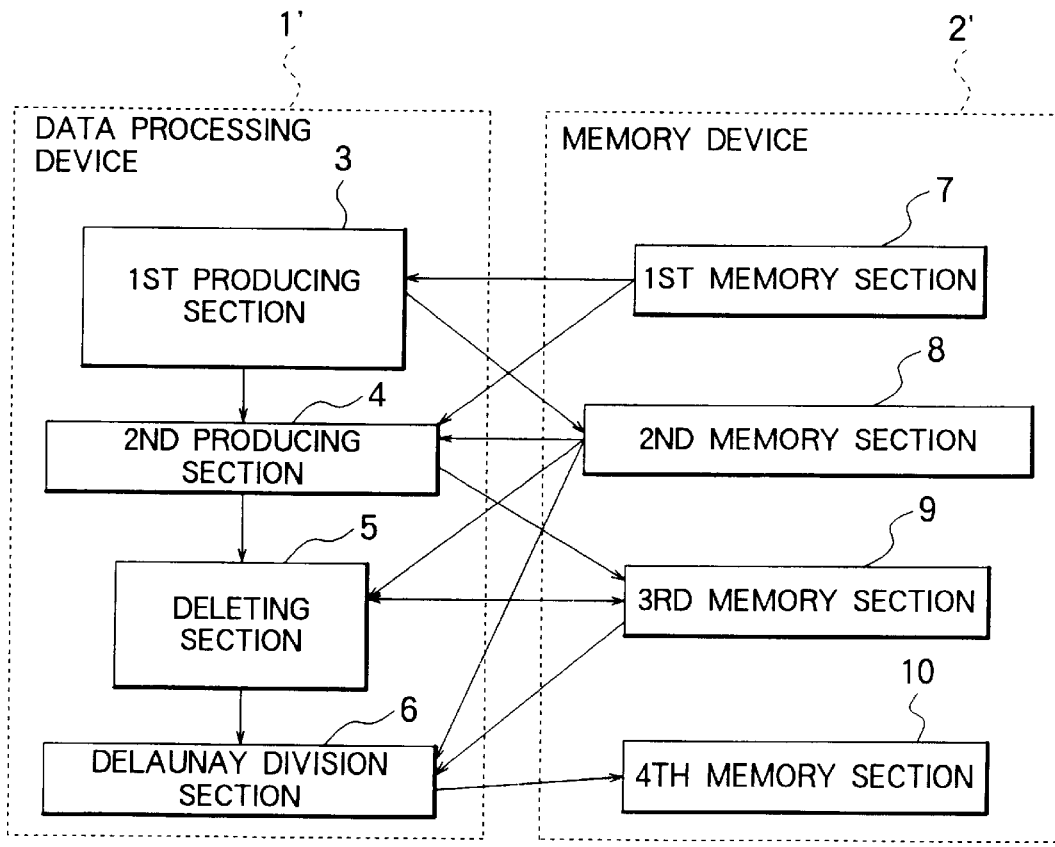
FIG. 10 is a block diagram of a grid point producing apparatus according to a preferred embodiment of this invention.

Referring to FIG. 10, description will proceed to a grid producing apparatus according to a preferred embodiment of this invention. The illustrated grid producing apparatus comprises a data processing device 1' and a memory device 2'. The memory device 2' comprises a first memory section 7 for storing first information representative of an analytic region, a second memory section 8 for storing second information representative of surfaces of the analytic region and grid information on a boundary, a third memory section 9 for storing third information representative of basic grid, and a fourth memory section 10 for storing fourth information representative of discreted grid.

The data processing device 1' comprises a first producing section 3 for producing the second information on the basis of the first information. A second producing section 4 is for producing the third information in accordance with first and the second information. A deleting section 5 is for deleting unused basic grid points from the third information to produce a renewal basic grid information in accordance with the second information. A Delaunay division section 6 carries out Delaunay division on the basis of the second information and the renewal basic grid information to produce the fourth information.

Figure 11:
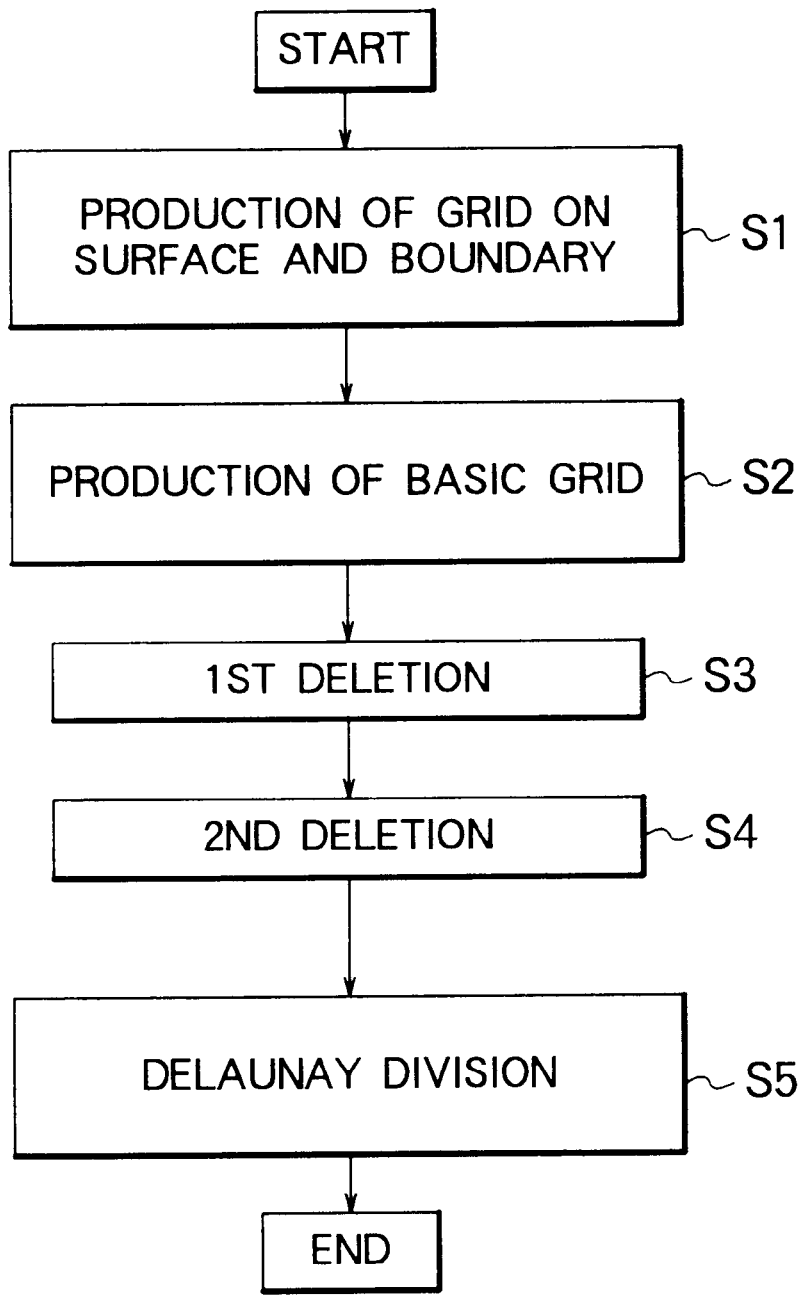
FIG. 11 is a flow chart for describing a process of the grid point producing apparatus illustrated in FIG. 10.

Referring to FIG. 11 in addition to FIG. 10, the first producing section 3 produces a grid or grids on the surface and the boundary of the analytic region at a first step S1 a shown in FIG. 11. In the first step S1, modification may be carried out in order to prevent the CV region from passing the surface and the boundary. In production of two dimensional grid, the boundary is represented by line segments representative of grid points as end points. In production of three dimensional grid, a rectangular grid is formed on the boundary.

Figure 12A:
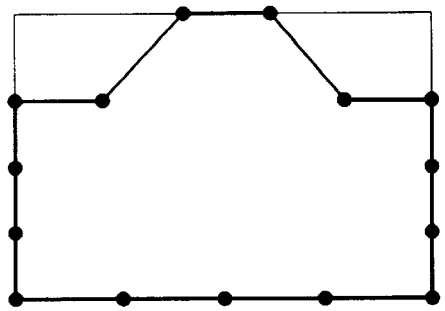
FIGS. 12A through 12D show a view for describing a first example of a condition of a grid point.

More specifically, FIG. 12A shows the boundary of two dimensional analytic region that is illustrated by a thick line. In FIG. 12A, the boundary is discreted by the grid points illustrated by black circles to be processed into the line segments.

In the example being illustrated in FIG. 8A, a perpendicular is drawn from the point B to the segment AC. An additional grid point is added at a cross point of the perpendicular and the segment AC. As a result, it is possible to prevent the CV region from passing the boundary.

Figure 13A:
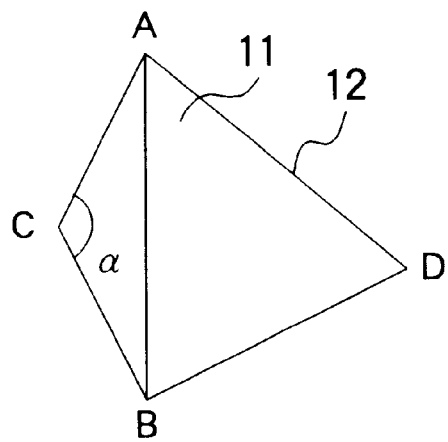
FIGS. 13A through 13C show a view for describing a modification of a grid point located on a surface or a boundary.
Figure 13B:
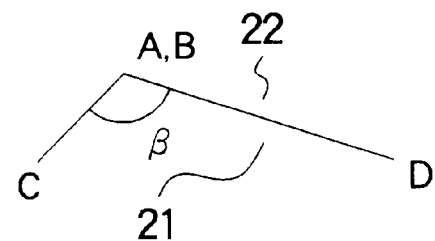
Figure 13C:
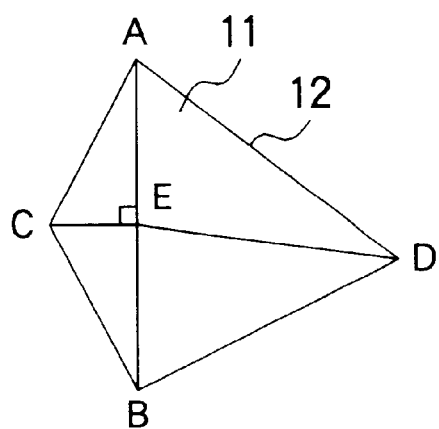

Referring to FIGS. 13A through 13C, an example of three dimensional region will be described. FIGS. 13A and 13B show a top view and a front view in a condition at which two triangle elements is adjacent to each other with interposing a grid line 12 (AB) on the boundary of the analytic region surface 11, respectively. Four vertexes A, B, C, and D are located on the boundary, respectively. In case where an angle $\alpha$ between segments CA and CB is an obtuse angle and an angle $\beta$ between two triangle elements is an angle less than 180 degrees, each CV region of the vertexes A, B, and C passes the boundary of the analytic region. In order to prevent the above-mentioned problem, it is necessary to move the vertex C and to make the angle $\alpha$ be an non-obtuse angle. Alternatively, a perpendicular may be drawn from the vertex C to the segment AB. An additional grid point E is added at a cross point of the perpendicular and the segment AB as shown in FIG. 13C.

Again referring to FIGS. 10 and 11, the second producing section 4 produces the basic grid as described above at a second step S2 as shown in FIG. 11. More particularly, the second producing section 4 forms the rectangular region including the analytic region. The second producing section 4 recurrently divides the rectangular region into a plurality of micro-rectangular regions until a predetermined approximation is obtained in order to produce the basic grid.

The second step S2 is followed by a third step S3 labelled "1st DELETION" in FIG. 11. In the third step S3, unnecessary grid points are deleted which are located out the analytic region. The deleting section 5 judges whether or not each of the basic grid points is included in the polygon region in the third step S3. Plumb line method or Backet method is know in the art as such a judgement.

The third step S3 is followed by a fourth step S4 labelled "2ND DELETION" in FIG. 11. The deleting section 5 judges whether or not the CV region passes the boundary in each of the basic grid points. When the CV region passes the boundary, the deleting section 5 deletes the basic grid point. In the fourth step S4, a method may be used in which the CV region is actually formed in order to judge whether or not the CV region crosses with the boundary. However, it is difficult to realize this method in program inasmuch as the process is complex in the method.

In general, the grid points near the boundary is often deleted in the above-mentioned step. On producing the basic grid, it is desired to judge whether or not each of grid points is near the boundary in order to prevent fruitless divisions.

Figure 12B:
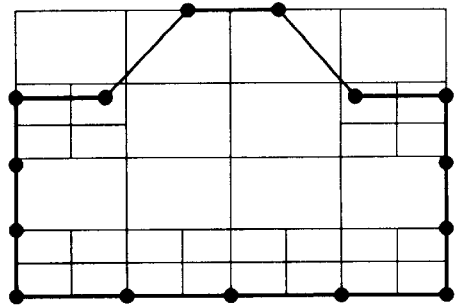

Furthermore, the basic grid may be produced according to condensation and rarefaction of boundary grid. When the basic grid element includes the boundary grid points of which number is greater than a predetermined upper level (for example, one), the basic grid element is subjected to division. FIG. 12B shows a view for recurrently dividing the rectangular region into the micro-rectangular regions until one grid point is included in the basic grid element.

It is possible to easily carry out the detection of the basic grid points by using information representative of boundary grid which is preliminarily given. When the grid point are given as the boundary grid point on the boundary, a specific region on which no grid point should be located is determined as a set of location of the grid points of which CV regions pass the boundary. On deleting selected ones of the basic grid points as selected grid points which exist near the boundary, it is sufficient to detect the basic points in the specific region. The specific region will be called an inhibit region.

On producing two dimensional grid, the inhibit region is determined to each grid line on the boundary. The inhibit region is determined by an inside portion (23) of a semicircle whose diameter is the grid line as shown FIG. 14A. The inside portion 23 is positioned on analytic region. The reference numeric 21 represents an inside region positioned inside the analytic region. The reference numeric 22 represents an outside region positioned outside the analytic region. The inhibit region becomes a combined region having semicircle regions each of which is obtained on the basis of each grid line. Not only the basic grid points but also the grid points on the boundary do not have to exist in the inhibit region. As shown in FIG. 14B, the outside region 22 exists between a grid point (v) and the grid line which forms the inhibit region in case the grid line can not be seen from the grid point (v). In this case, the grid point (v) is able to exist in the inhibit region. Inasmuch as it is difficult to judge whether or not the grid line can be seen from grid point (v), the grid point (v) may be deleted. In the example being illustrated in FIG. 14B, the grid point (v) is a characteristic point for form on the boundary. Therefore, it is impossible to delete the grid point (v). In this case, the boundary grid is modified as will be described later in order that the grid point (v) does not exist in the inhibit region.

Figure 12C:
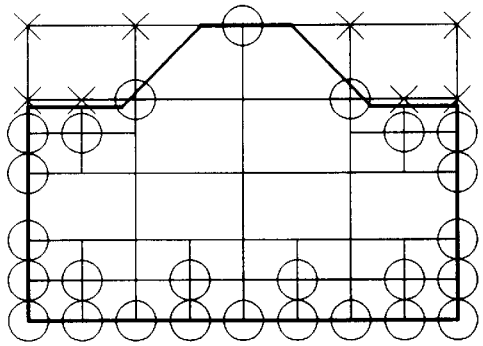

In FIG. 12C, each of crosses represents the grid point outside the analytic region in concern with the boundary grid and the basic grid which are illustrated in FIG. 12B. Each of white circles represents the grid point inside the inhibit region in concern with the boundary grid and the basic grid which are illustrated in FIG. 12B.

Referring to FIGS. 15A and 15B, description will be made about production of three dimensional grid. The inhibit region is formed in correspondence to the surface, grid elements on the boundary, and each of grid lines, respectively. In case where the grid element is a non-obtuse triangle, the inhibit region is formed in a semisphere inside the analytic region in concern with a circumscribed sphere of the grid element triangle 11 that has the circumcenter of the grid element triangle 11 as the center as shown in FIG. 15A. In concern with each segment of the triangle 11, semispheres are formed which have each segment as a diameter, respectively. The inhibit region is further formed in each semisphere inside the analytic region in concern with each segment. The surface cutting the sphere is a plane including the grid element triangle. Inasmuch as the grid line is adjacent to two grid elements, two semispheres corresponds to the grid line in concern with the inhibit region.

Figure 16A:
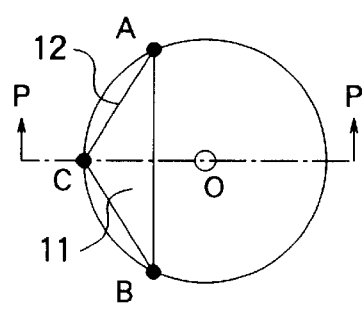
FIGS. 16A and 16B show a view for describing a prohibiting region of an obtuse triangle in a three dimension.
Figure 16B:
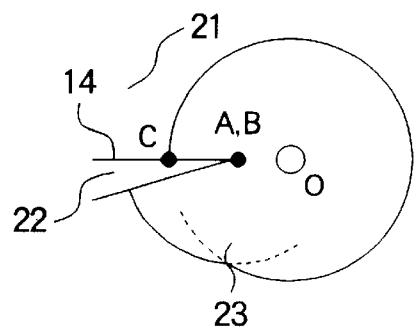

In case where the grid element is an obtuse triangle, illustration is made in FIG. 16A about the grid element 11 of the obtuse triangle and the circumscribed sphere having the circumcenter (O) of the grid element 11 as the center. In concern with the segments CA and CB each of which is not an opposite side of the obtuse angle, the inhibit region is formed as described above. Illustration is made about the inhibit region concerned with the segment AB and the grid element 11 in FIG. 16B. FIG. 16B shows a sectional view out along P—P line of FIG. 16A. As shown in FIG. 16B, the inhibit region is formed inside the circumscribed circle having the circumcenter (O) as the center. In the outside of the analytic region of the plane including the grid element 11, the inhibit region is formed inside the sphere having the segment AB as the diameter.

Inasmuch as the region shown in FIG. 16B is obtained as the inhibit region, the grid point may be deleted by using the inhibit region illustrated in FIG. 16B. However, it is not desirable to locate such a grid point in calculating accuracy. Accordingly, it is desirable to locate the grid point which divides the segment AB. Alternatively, it is desirable that the point C is far from the segment AB in order to avoid the obtuse triangle.

In case of the obtuse triangle and the non-obtuse triangle, the inhibit region does not have the basic grid point, the grid point on the surface, and the grid point on the boundary. The grid point may not be delete which exists on the surface or the boundary. In this case, the grid line or the grid element is divided which corresponds to the inhibit region including the grid point, in order to carry out deletion of the grid point. Such a modification of the grid is carried out in the first step S1 described above. Form of the analytic region is not varied even if the grid point of the basic grid is deleted. Therefore, it is unnecessary to modify the boundary grid in a fourth step S4 illustrated in FIG. 11.

Inasmuch as the inhibit region is the combined region of semispheres or spheres, deleting point should be deleted is easily detected when the deleting section (FIG. 10) judges whether or not the grid point is included in the inhibit region.

As described above, the inhibit region is composed of semisphere region. It will be assumed that the inhibit region is formed by sphere region. The sphere region is wider in volume than the semisphere, deleting point should be deleted is further easily detected when the deleting section (FIG. 10) judges whether or not the grid point is included in the sphere region which is used as the inhibit region.

Figure 12D:
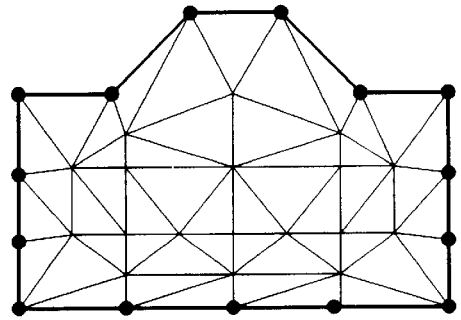

After unusable basic grid points are deleted in a manner described above, the Delaunay division section 6 (FIG. 10) carries out Delaunay division of the analytic region on the basis of the remaining basic grid points and boundary grid points at a fifth step S5 as shown in FIG. 11. As a result, the discreted grid is obtained which is illustrated in FIG. 12D. The discreted grid is stored as the fourth information in the fourth memory section 10 (FIG. 10).

As described above, the boundary grid is produced which is independent of the basic grid. As a result, it is possible to dissolve inexpedient location of boundary grid points on producing boundary grid points. Furthermore, it is possible to delete the grid point at which the CV region passes the boundary inasmuch as the basic point in the inhibit region is deleted in accordance with the boundary grid information.

Figure 17A:
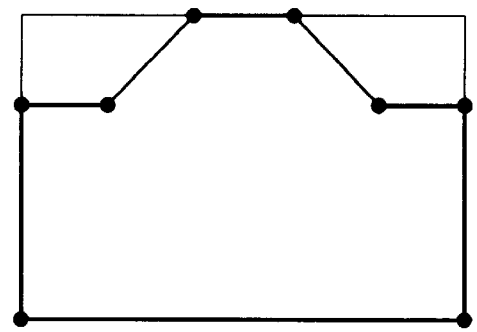
FIGS. 17A through 17D show a view for describing a second example of a condition of a grid point.
Figure 17B:
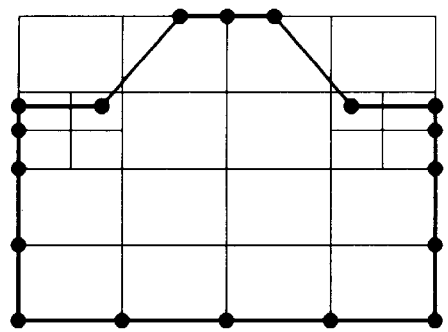
Figure 17C:
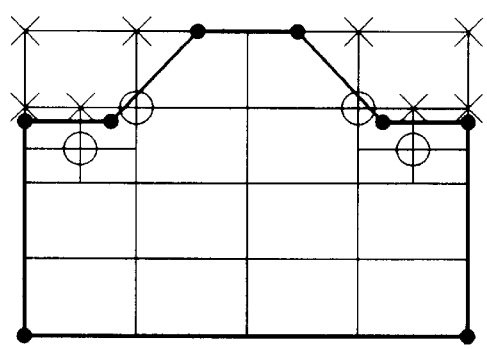
Figure 17D:
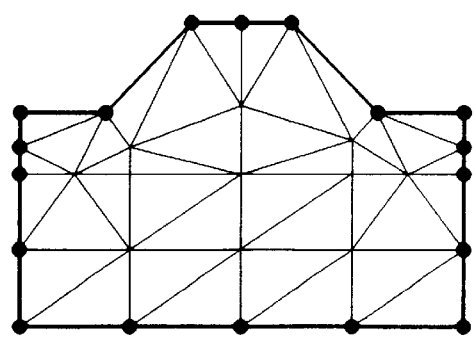

Referring to FIGS. 17A through 17D, description will proceed to another example of production of the discreted grid. Although the grid is preliminarily produced on the boundary in the example described above, the grid is omitted which is located on the surface positioned on the circumference of the rectangular region that corresponds to the boundary of the analytic region in this example. In this example, production of the grid is carried out by the grid point located on the surface on producing the basic grid. More specifically, FIG. 17A shows the boundary of two dimensional analytic region that is illustrated in a thick line. The boundary is discreted into line segments in accordance with the grid points each of which is illustrated by a black circle. In comparison with FIG. 12A, the grid points are not located on each of left and right vertical lines and a lower horizontal line in FIG. 17A. As shown in FIG. 17B, the grid points are located on the region surface in left and right ends and upper and lower ends. The grid points correspond to grid point locations of the basic grid. Therefore, the basic grid elements of FIG. 17B is less in number than the basic grid elements of FIG. 12B. The grid points in the inhibit regions are illustrated by white circles in FIG. 17C. It is sufficient to use the inhibit regions which correspond to four segments except the inhibit regions located on the surface of the left and the right ends and the upper and the lower ends. Therefore, the inhibit regions of FIG. 17C are less in number than the inhibit regions of FIG. 12C. In this example, the discreted grid is finally produced as shown in FIG. 17D.

As described above, it is possible to produce an applicable orthogonal grid on the analytic region comprising only horizontal lines (or horizontal surfaces) and plumb lines (or plumb surfaces). Similarly, it is possible to prevent the CV region from passing the surface even if the discreted grid is produced near the surface on the basis of the basic grid. In this example, the basic grid points decrease which are no use. In addition, it is possible to carry out deletion of the basic grid points at a high speed inasmuch as the surface grids decrease which are concerned with the inhibit regions.

Figure 18A:
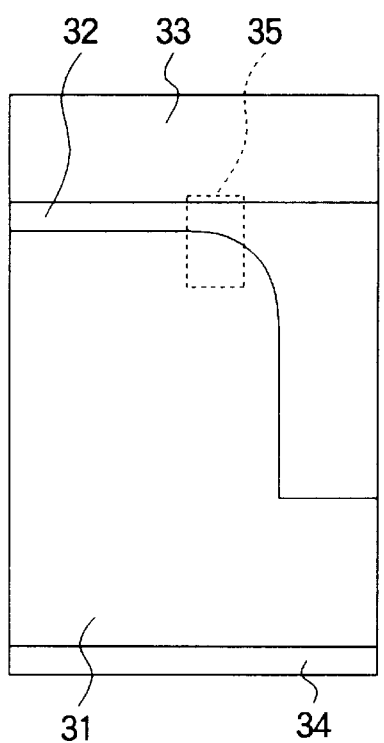
FIGS. 18A through 18C show a view for describing a device simulator to which this invention is applicable.
Figure 18B:
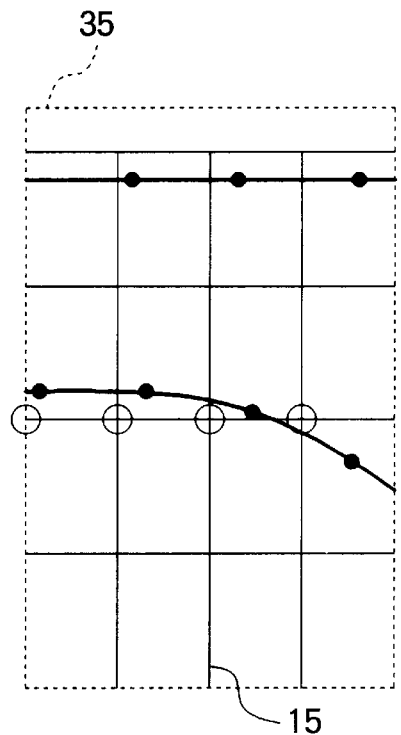
Figure 18C:
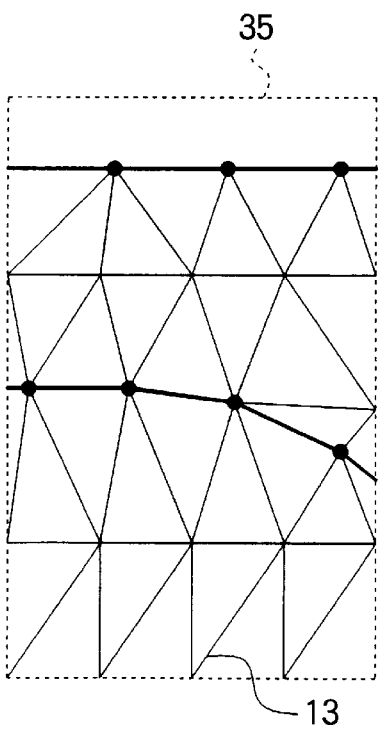

Referring to FIGS. 18A through 18C, discretion will proceed a device simulator for calculating a electric characteristic of a semiconductor device. The device simulator uses the fashion of producing the discreted grid according to this invention. In FIG. 18A, the illustrated semiconductor device comprises a silicon portion 31, an oxide silicon portion 32, a gate electrode portion 33, and a substrate electrode portion 34. Inasmuch as each of electrodes gives a fixed boundary condition, it is unnecessary to produce on the grids on the gate electrode portion 33 and the substrate electrode portion 34. The grids are produced on the silicon portion 31 and the oxide silicon portion 32. In FIG. 18B for enlarging a portion labelled a reference numeric 35, the boundary grids and the basic grids 15 are produced in the portion 35. Inasmuch as the analytic region is a two dimensional region, the basic grids 15 are deleted which are located in a circle having a grid line on the boundary as the diameter.

As a result, the grid points are deleted which are near the lower boundary and which are illustrated by white circles. Finally, the discreted grid 13 is produced which is shown in FIG. 18C.

While this invention has thus far been described in conjunction with the preferred embodiment thereof, it will readily be possible for those skilled in the art to put this invention into practice in various other manners.

What is claimed is:

1. An apparatus programmed to discretize an analytic region of a geometrical object into a plurality of micro-regions of discreted grid points on numerically solving a partial differential equation, said apparatus producing a discreted grid for use in obtaining simultaneous equations approximating to said partial differential equation, said apparatus comprising:

first means for discreting a surface and a boundary of said analytic region to obtain grid points; and second means for controlling locations of said grid points so that said grid points are not located in a predetermined region of the geometrical object that is defined by a region on which a specific one of said micro-regions crosses any one of said surface and said boundary when a specific one of said grid points is located in said predetermined region.

2. A computer programmed to discretize a two dimensional analytic region of a geometrical object into a plurality of micro-regions of discreted grid points on numerically solving a partial differential equation, said apparatus producing a discreted grid for use in obtaining simultaneous equations approximating to said partial differential equation, said apparatus comprising:

first means for discreting a surface and a boundary of said analytic region to obtain grid points; and second means for controlling locations of said grid points so that said grid points are not located in a predetermined region of the geometrical object, said second means defining a circle region having a grid line as a diameter on any one of said surface and said boundary of said analytic region, said second means further defining a semicircular region of said circle region that is located in said analytic region, said second means controlling the locations of said grid points so that said grid points are not located in said semicircular region.

3. A computer programmed to discretize a three dimensional analytic region of a geometrical object into a plurality of micro-regions of discreted grid points on numerically solving a partial differential equation, said apparatus producing a discreted grid for use in obtaining simultaneous equations approximating to said partial differential equation, said apparatus comprising:

first means for discreting a surface and a boundary of said analytic region to obtain grid points; and second means for controlling locations of said grid points so that said grid points are not located in a predetermined region of the geometrical object, said second means defining a circumscribed sphere with a center located at a circumcenter of each grid element triangle of said analytic region, said second means further defining three spheres having side segments of said grid element triangle as diameters, respectively, to combine said circumscribed sphere and said there spheres into a combined sphere region, said second means controlling the locations of said grid points so that said grid points are not located in said combined sphere region in all of said triangle grid elements.

4. A computer programmed to discretize a there dimensional analytic region of a geometrical object into a plurality of micro-regions of discreted grid points on numerically solving a partial differential equation, said apparatus producing a discreted grid for use in obtaining simultaneous equations approximating to said partial differential equation, said apparatus comprising:

first means for discreting a surface and a boundary of said analytic region to obtain grid points; and second means for controlling locations of said grid points so that said grid points are not located in a predetermined region of the geometrical object, said second means constructing a grid element triangle on any one of said surface and said boundary by a non-obtuse triangle of said analytic region, said second means defining a circumscribed sphere with a center located at a circumcenter of said non-obtuse triangle, said second means further defining three sphere regions having segments of said non-obtuse triangle as diameters, respectively, said second means dividing said circumscribed sphere region and said three sphere regions by a plane including said non-obtuse triangle to define four semisphere regions as a combined semisphere region which is located in said analytic region, said second means controlling the locations of said grid points so that said grid points are not located in said combined sphere region in any of said triangle grid elements.

5. A computer programmed to discretize an analytic region of a geometrical object into a plurality of micro-regions of discreted grid points on numerically solving a partial differential equation, said apparatus producing a discreted grid for use in obtaining simultaneous equations approximating to said partial differential equation, said apparatus comprising:

a first memory section for storing first information representative of said analytic region;

a second memory section for storing second information representative of surfaces of said analytic region and grid information of a boundary of said analytic region;

a first producing section for producing, from said first information, said second information;

a second producing section for producing, from said first information and said second information, basic grid points on said analytic region;

a third memory section for storing said basic grid points;

a deleting section for deleting selected ones of said basic grid points in accordance with said second information to produce remaining basic grid points;

a grid producing section for producing said discreted grid on the basis of said remaining basic grid points and said second information; and a fourth memory section for storing information representative of said discreted grid.

* * * * *